US007347502B2

(12) United States Patent
Courtney et al.

(10) Patent No.: US 7,347,502 B2
(45) Date of Patent: Mar. 25, 2008

(54) WHEEL DESIGN

(76) Inventors: Eric Scott Courtney, 11909 Grant Rd., Apt. A13, Cypress, TX (US) 77429; Shawn Le-Curt Ian Harris, 3777 S. Gessner #501, Houston, TX (US) 77063

(*) Notice: Subject to any disclaimer, the term of this patent is extended or adjusted under 35 U.S.C. 154(b) by 192 days.

(21) Appl. No.: 11/071,419

(22) Filed: Mar. 3, 2005

(65) Prior Publication Data

US 2006/0181138 A1 Aug. 17, 2006

Related U.S. Application Data

(60) Provisional application No. 60/549,956, filed on Mar. 4, 2004.

(51) Int. Cl.
*B60B 7/00* (2006.01)
*B60B 7/14* (2006.01)

(52) U.S. Cl. .................. 301/37.106; 301/37.102; 301/37.38

(58) Field of Classification Search ........... 301/37.101, 301/37.26, 37.28, 37.102, 37.34, 37.371, 301/37.106, 37.108, 37.38, 37.372, 37.376
See application file for complete search history.

(56) References Cited

U.S. PATENT DOCUMENTS

| 3,092,420 | A | * | 6/1963 | Baldwin et al. | ......... 301/37.38 |
| 3,170,733 | A | * | 2/1965 | Lamme | ................ 301/37.21 |
| 3,317,247 | A | * | 5/1967 | Lamme | ................ 301/37.38 |
| 4,083,606 | A | * | 4/1978 | Scruggs | ................ 301/37.21 |
| 4,961,611 | A | * | 10/1990 | Patti | ................ 301/37.38 |
| 6,089,671 | A | * | 7/2000 | Iacovelli et al. | ....... 301/37.108 |
| 6,120,104 | A | | 9/2000 | Okamoto et al. | |
| 6,443,529 | B1 | | 9/2002 | Williams | |
| 6,536,848 | B1 | | 3/2003 | Goodman | |
| 6,554,370 | B2 | | 4/2003 | Fowlkes | |
| 6,568,110 | B2 | | 5/2003 | Lee et al. | |
| 6,575,537 | B1 | | 6/2003 | Wang | |
| 6,637,830 | B1 | | 10/2003 | Burgess | |
| 6,655,061 | B1 | | 12/2003 | Good | |
| 6,669,305 | B2 | | 12/2003 | Ichikawa | |
| 6,672,676 | B2 | * | 1/2004 | Zaniboni | ............... 301/37.101 |
| 7,055,915 | B2 | * | 6/2006 | Fitzgerald | .............. 301/37.106 |
| 2003/0038529 | A1 | | 2/2003 | Hsu et al. | |

\* cited by examiner

*Primary Examiner*—Jason R. Bellinger
(74) *Attorney, Agent, or Firm*—Fay Sharpe LLP

(57) ABSTRACT

A wheel assembly includes a wheel, a wheel cover, and a shaft for connecting the wheel cover to the wheel. The wheel defines a rotational axis. The wheel includes a central hub and a rim connected to and radially spaced from the central hub. The wheel cover includes a central portion that defines central opening and a plurality of spokes radiating from the central portion. Each spoke curves toward the rim of the wheel so that a portion of each spoke is spaced from the central hub of the wheel in a direction that is parallel to the rotational axis. A shaft connects the wheel to the wheel cover. The central opening of the wheel cover receives the shaft and the wheel cover is adapted to cooperate with one of the shaft and the wheel such that the wheel cover is fixed to the wheel so that the wheel cover does not rotate independently of the shaft and the wheel.

12 Claims, 5 Drawing Sheets

WHEEL DESIGN

This application claims the benefit of U.S. Provisional patent application Ser. No. 60/549,956, filed Mar. 4, 2004.

SUMMARY OF THE INVENTION

A wheel assembly includes a wheel, a wheel cover, and a shaft for connecting the wheel cover to the wheel. The wheel defines a rotational axis. The wheel includes a central hub and a rim connected to and radially spaced from the central hub. The wheel cover includes a central portion that defines central opening and a plurality of spokes radiating from the central portion. Each spoke curves toward the rim of the wheel so that a portion of each spoke is spaced from the central hub of the wheel in a direction that is parallel to the rotational axis. A shaft connects the wheel to the wheel cover. The central opening of the wheel cover receives the shaft and the wheel cover is adapted to cooperate with one of the shaft and the wheel such that the wheel cover is fixed to the wheel so that the wheel cover does not rotate independently of the shaft and the wheel.

BRIEF DESCRIPTION OF THE FIGURES

FIG. 2b is a cross-sectional view taken along line 2b-2b of FIG. 2a.

DETAILED DESCRIPTION

Figure 2:
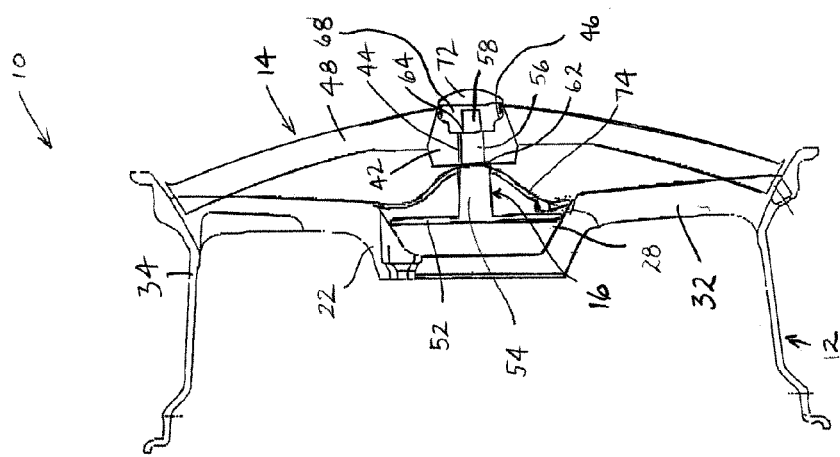
FIG. 2 is a cross-sectional view of an assembled wheel assembly that includes the wheel of FIG. 1.
Figure 1:
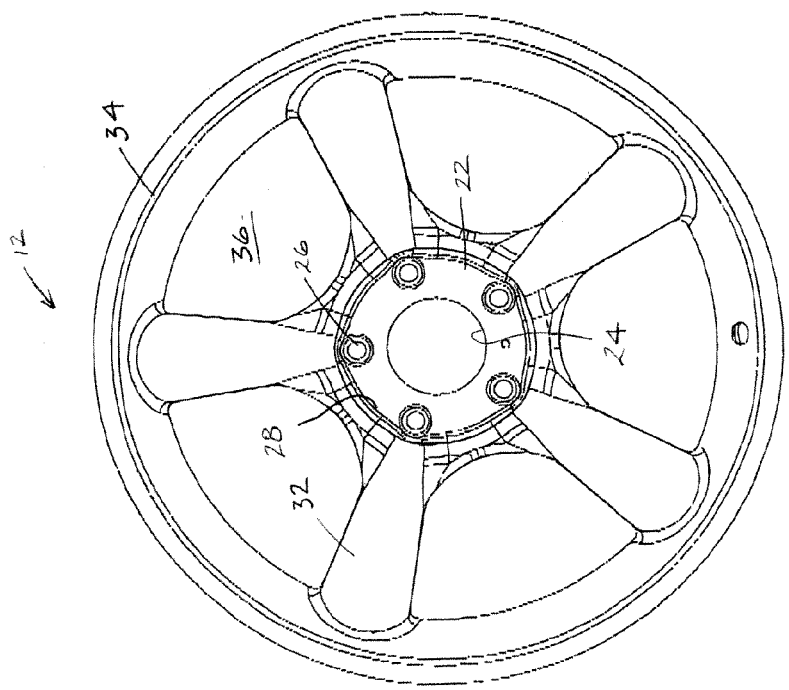
FIG. 1 is a front view of a wheel that comprises a portion of a wheel assembly.

With reference to FIG. 2, a wheel assembly 10 for an automobile includes a wheel 12, an outer wheel cover 14 and a shaft 16 for connecting the outer wheel cover to the wheel. The wheel is similar to a conventional wheel in the way that it mounts to an automobile (not shown) and in the way that a conventional tire (not shown) mounts to the wheel. With reference to FIG. 1, the wheel 12 includes a central hub area 22 having a central opening 24 and a plurality of bolt openings 26 spaced from and around the periphery of the central opening. The wheel 12 attaches to the automobile in a conventional manner via the bolt openings 26 receiving bolts and lug nuts threadably received on the bolts. The central opening 24 and the bolt openings 26 are disposed in a circular recess 28 formed in the central hub area 22.

Figure 3:
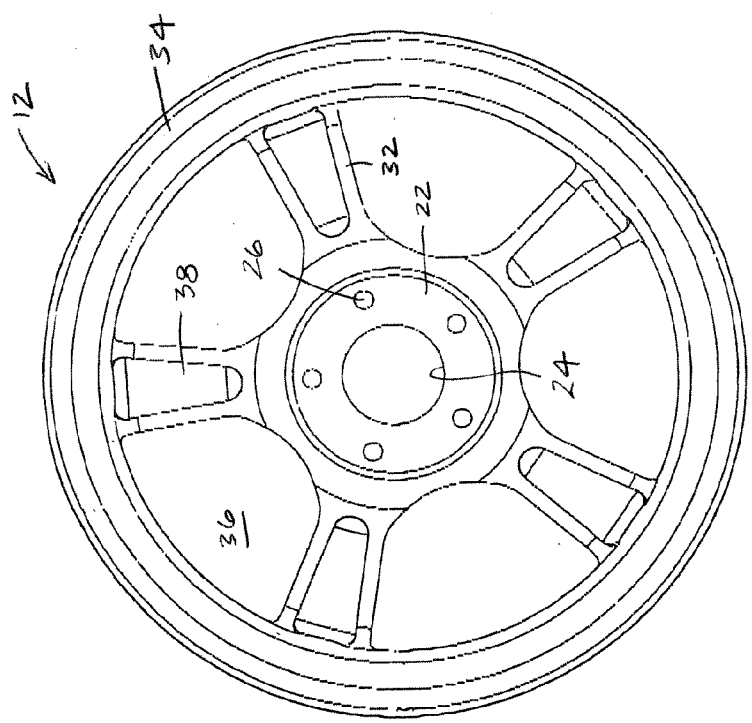
FIG. 3 is a rear view of the wheel of FIG. 1.
Figure 2A:
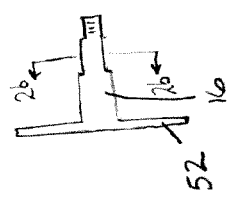
FIG. 2a is a side view of a base and shaft that is shown in cross section in FIG. 2.
Figure 2B:
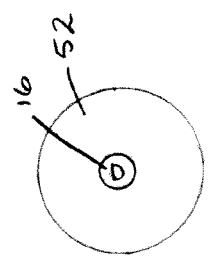

With reference to FIG. 1, plurality of spokes 32 radiate from the hub area 22 toward a rim 34 of the wheel 12. A conventional tire mounts to the wheel 12 around the rim 34. The spokes 32 interconnect the hub area 22 and the rim 34 to define a plurality of openings 36. The wheel 12 can be manufactured, e.g. cast, forged and/or stamped, from metal, e.g. aluminum, to form one unitary piece. In the depicted embodiment, the spokes 32 include a substantially U-shaped or V-shaped portion in a cross-section that is taken normal to the radius of the wheel 12 to form recesses 38 visible in FIG. 3. Furthermore, the spokes 32 are wider at their intersection with the rim 34 and continually narrow toward the central hub 22. The spokes 32 can take configurations other than those depicted. The outer visible portions of the wheel 12, i.e. the portion of the wheel visible by an onlooker from the side of the automobile including the spokes 32 and the rim 34, have an attractive finish, for example a highly polished finish. The wheel 12 can take other configurations, such as a configuration that does not include the spokes.

Figure 6:
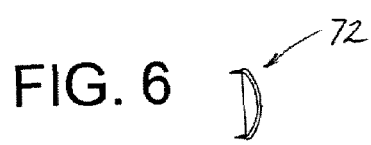
FIG. 6 is a cross-sectional view of an outer cap for the wheel assembly of FIG. 2.
Figure 7:
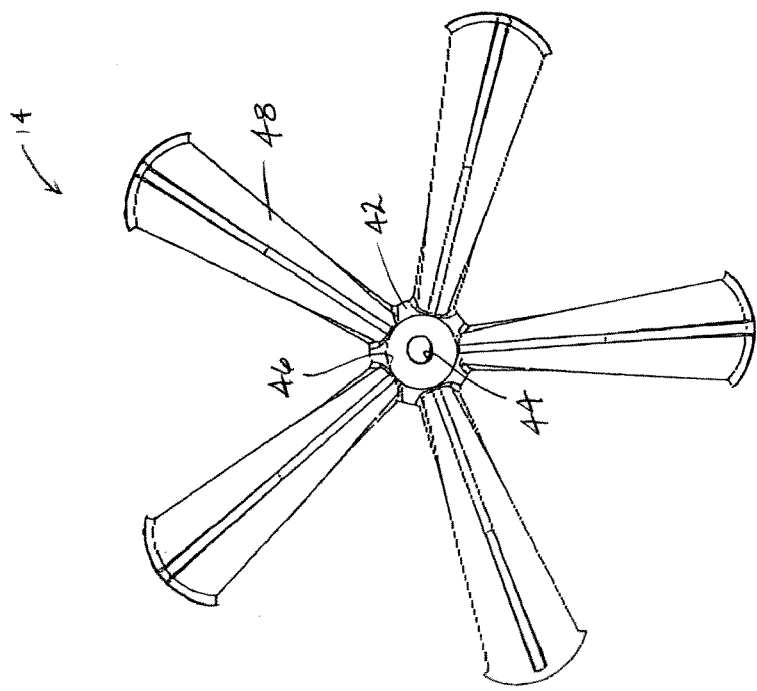
FIG. 7 is a front view of an outer wheel cover of the wheel assembly of FIG. 2.
Figure 9:
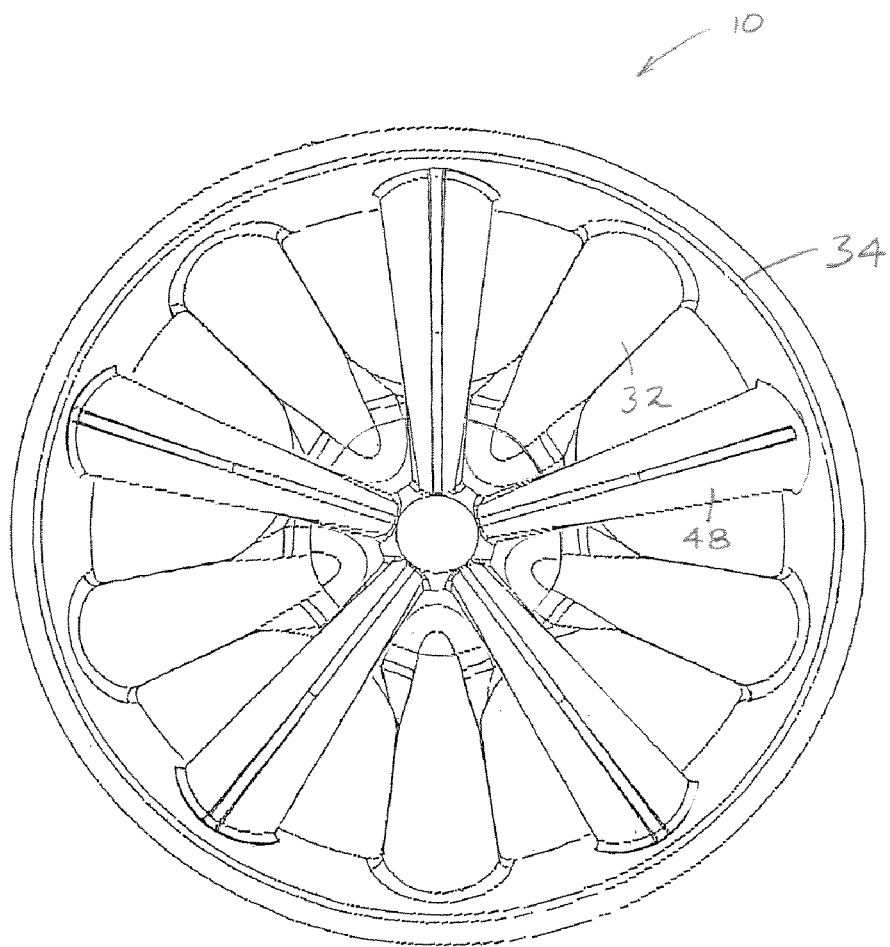
FIG. 9 is a front view of the wheel assembly shown in FIG. 2 without an outer cap that is shown in FIG. 2.

As seen in FIG. 2, the outer wheel cover 14 mounts to the shaft 16. With reference to FIGS. 6 and 7, the outer wheel cover 14 includes a central hub area 42 that includes a central opening 44 and a counterbore 46 that is coaxial with the central opening. The central opening 44 receives the shaft 16 to connect the outer wheel cover 14 to the wheel 12, in a manner that will be described in more detail below.

The outer wheel cover 14 also includes a plurality of spokes 48 radiating from the central hub area 42. The spokes 48 radiate towards the rim 34 of the wheel 12 having a distal end rest on a ledge defined on an inner periphery of the rim. When the outer wheel cover 14 is attached to the wheel 12, the distal end of each spoke 48 of the outer wheel cover 14 can be interposed between distal ends of two adjacent spokes 32 of the wheel 12. The spacing between the distal ends can be even around the rim 34. The spokes 48 terminate at the rim 34, and in the depicted embodiment the spokes do not attach to the rim 34. The spokes 48 are similar in shape to the spokes 32 of the wheel 12; however, in alternative embodiments the spokes of the outer wheel cover can take different configurations.

With reference to FIG. 2, the shaft 16 connects to the outer wheel cover 14 to the wheel 12. The shaft 16, in the depicted embodiment, is located in the rotational axis of the wheel 12. The shaft 16 connects to a base 52 that is configured to selectively attach to the hub area 22 of the wheel. The shaft 16 can connect to the base 52 via a welded connection, a fastener connection (e.g. threaded connection), and/or the shaft and the base can be made (e.g. cast, stamped) from a single piece of material (e.g. metal). In the depicted embodiment, the base 52 is plate having a circular periphery and a plurality of openings that align with the bolt openings 26 in the wheel 12. The base 52 is received in the circular recess 28 formed in the central hub are 22 of the wheel. The studs used to connect the wheel 12 to the automobile can extend through the openings in the base 52 to connect the base 52 to the wheel 12. In alternative embodiments, the base 52 can take other configurations, one example being where the base is curved, such as a cone of frustoconical shape. The base 52 can also attach to the wheel 12 in other conventional manners and need not require the respective openings to align with one another. For example, the base 52 can include openings that align with openings in the central hub area 22 of the wheel 12 to receive fasteners (not shown) to attach the base to the wheel. The base 52 can also be permanently affixed to the wheel 12 via welding and the like.

The shaft 16 can be stepped to accommodate different components of the wheel assembly 10. A first portion 54 of the shaft 16 is adjacent the base 52, a second portion 56 of the shaft 16 is adjacent the first portion 54 and the shaft 16 terminates with a third portion 58. The first portion 54 has a greater diameter than the second portion 56 so that a first radial shoulder 62 is formed at their intersection. The second portion 56 has a greater diameter than the third portion 58 so that a second radial shoulder 64 is formed at their intersection.

As mentioned above, the central opening 44 of the outer wheel cover 14 receives the shaft 16. As seen in the embodiment depicted in FIG. 2, the central opening 44 of the outer wheel cover 14 is received by the second portion 56 of the shaft 16 and is seated on the first radial shoulder 62. In the depicted embodiment, the second portion 56 of the shaft 14 has a noncircular configuration so that upon being received by the central opening 44 of the outer wheel cover 14, a key-like mating relationship between the shaft 16 and the outer wheel cover is achieved. Accordingly, rotation of the shaft 16 results in rotation of the outer wheel cover 14. Since the shaft 16 is fixed to the wheel 12, rotation of the wheel results in rotation of the wheel cover 14 so that the wheel cover is inhibited from rotation that is independent of rotation of the wheel. This keyed-type connection can be achieved by flattening a lateral portion of the second portion 56 of the shaft 14, or by other known connections that restrict independent rotation of the outer wheel cover 14 in relation to the shaft 16. For example, keyed notches can be formed in either the shaft or the outer wheel cover near the central opening, and these notches can cooperate with corresponding protrusions to restrict independent rotational movement of the outer wheel cover with respect to the shaft.

A nut (not shown) can attach to the third portion 58, which can be threaded, of the shaft 42 to mount the outer wheel cover 14 to the shaft 16. In such an embodiment, at least a portion of nut 68 is received in the counterbore 46. The nut can include an attractive finish on its outer visible surface. In an embodiment where the nut does not include an attractive finish, an outer cap 72 (FIG. 6) that fits into the counterbore 46 of the outer wheel cover 14 can be provided. Since the central hub area 42 of the outer wheel cover 14 is spaced from hub area 22 of the wheel 12 because it is seated on the first radial shoulder 62, the spokes 48 of the outer wheel cover 14 are curved toward the rim 34 of the wheel more so than the spokes 32 of the wheel 12. Accordingly, the spokes 48 of the outer wheel cover 14 are spaced from the central hub 22 and/or the spokes 32 of the wheel 12 in a direction that is parallel to the rotational axis of the wheel.

Figure 4:
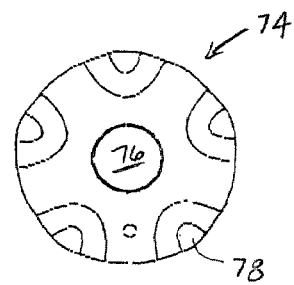
FIG. 4 is a front view of a fastener cap of the wheel assembly of FIG. 2.
Figure 5:
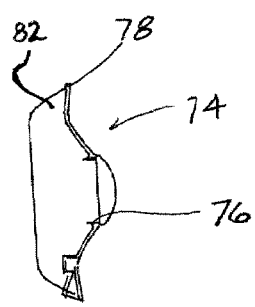
FIG. 5 is a cross-sectional view of the fastener cap of FIG. 4.
Figure 8:
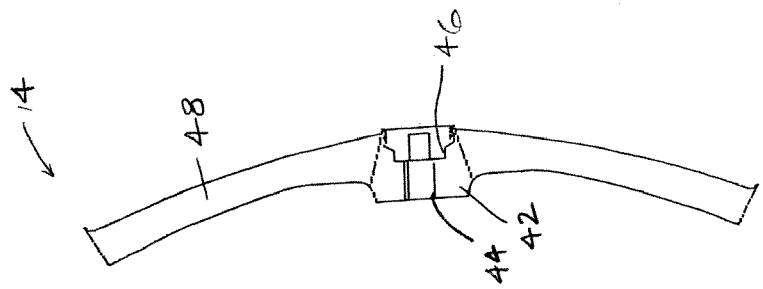
FIG. 8 is a cross-sectional view of the outer wheel cover of FIG. 7.

An intermediate cap 74 can be provided to cover the base 52, since the base may not be made to include an attractive finish. In such an embodiment, the intermediate cap 74 adds to the three-dimensional appearance of the wheel 12. With reference to FIGS. 4 and 5, the intermediate cap 74 includes a central opening 76 to receive the shaft 16. The central opening 76 has a diameter slightly larger than the first portion 54 of the shaft 16. The intermediate cap 74 is shaped similar to the frustum of a cone. A plurality of outer curved portions 78 define recesses 82 so that a portion of the intermediate cap rests on the spokes 32 of the wheel 12 when the intermediate cap receives the shaft 16. The curved portions 78 are complementary in shape to the surface of the spokes 32 proximal the hub area 22 so that the intermediate cap 16 snugly rests on the spokes. The intermediate cap 74 is trapped between the central hub area 42 of the outer wheel cover 14 and the central hub area 22 of the wheel 12. The outer, i.e. visible, surface of the intermediate cap 74 has an attractive finish similar to the finish of the visible portion of the wheel 12, as described above.

The wheel assembly 10 provided allows for an attractive wheel 12 and wheel cover 14. The wheel cover 14 attaches to the wheel 12 by way of the shaft 16, which allows the owner of the wheel assembly 10 to quickly change wheel covers without having to loosen many nuts. In an embodiment where the shaft is fastened to the base via a threaded connection, only the shaft needs to be removed to change the wheel cover. Accordingly, even though only one wheel cover 14 was described with particularity, many possible wheel covers that include an opening to receive the shaft 16 can mount to the wheel 12. The wheel cover 14 preferably mounts to the shaft 16 so that wheel cover 14 rotates along with the shaft and the remainder of the wheel. In other words, the angular displacement of a point on a wheel that results when the wheel rotates will equal the angular displacement of a point on the wheel cover the wheel cover, which is in contrast to the known spinable wheel covers. This can be achieved by limiting the independent rotational movement of the central hub area 42 of the outer wheel cover 14 by the connection between the shaft 16 and the wheel cover 14, or by having the spokes 48 of the wheel cover engage the rim 34 in such a manner that independent rotational movement of the wheel cover with respect to the shaft is limited.

With the spokes 32 of the wheel 12 and the spokes 48 of the outer wheel cover 14 interacting with the rim 34 as such, the wheel assembly 10 has the look of a two-piece wheel, even though the wheel 12 is made of one piece with the outer wheel cover 14 selectively attached to the wheel 12. Accordingly, the expense of welding or otherwise attaching the center section, which can include the central hub 22 and the spokes 32, to the rim 34 is obviated. The wheel assembly 10 has an attractive three-dimensional aspect to it in that the spokes 32 of the wheel 12 are spaced from the spokes 48 of the outer wheel cover 14.

A wheel assembly has been described with reference to preferred embodiments. Modifications and alterations will occur to those skilled in the art after reading the preceding description. The invention is not to be limited to only those embodiments described. Instead, the invention is to be broadly construed to include all embodiments that come within the scope of the appended claims and the equivalents thereof.

The invention claimed is:

1. A wheel assembly comprising:
   a wheel defining a rotational axis, the wheel comprising a central hub, a rim connected to and radially spaced from the central hub, and a plurality of wheel spokes that interconnect the central hub and the rim;
   a wheel cover comprising a central portion that defines a central opening and a plurality of wheel cover spokes radiating from the central portion, the central portion of the wheel cover being spaced axially from the central hub, wherein each wheel cover spoke extends from the central portion toward the rim of the wheel, a portion of each wheel cover spoke being axially spaced from a portion of a corresponding wheel spoke and distal ends of each wheel spoke being circumferentially spaced from distal ends of each wheel cover spoke around the rim of the wheel;
   a shaft connecting the wheel to the wheel cover and being aligned with the rotational axis, the central opening of the wheel cover receives the shaft and the wheel cover cooperates with one of the shaft and the wheel such that the wheel cover is fixed to the wheel so that the wheel cover rotates along with the shaft and the wheel; and
   a cap having a central opening for receiving the shaft, the cap being interposed between the wheel cover and the wheel, wherein the cap includes a plurality of recesses each dimensioned to receive a wheel spoke.

2. The wheel assembly of claim 1, wherein the cap includes an outer surface having a decorative finish.

3. The wheel assembly of claim 1, wherein the cap is dimensioned to cover the central hub of the wheel.

4. The wheel assembly of claim 1, wherein the shaft includes a threaded portion.

5. The wheel assembly of claim 4, further comprising a nut adapted to threadingly receive the threaded end of the shaft to retain the wheel cover on the shaft.

6. The wheel assembly of claim 5, wherein the central portion of the wheel cover includes a counterbore coaxial with the central opening and the nut is configured to be at least partially received in the counterbore.

7. The wheel assembly of claim 1, wherein the shaft includes a first radial shoulder axially spaced from the central hub portion of the wheel.

8. The wheel assembly of claim 7, wherein the wheel cover is seated on the first radial shoulder.

9. The wheel assembly of claim 1, wherein the shaft includes a noncircular portion in a cross section taken normal to the rotational axis, and the central opening of the wheel cover is dimensioned to receive the noncircular portion of the shaft so that the wheel cover is fixed to and rotates with the shaft.

10. The wheel assembly of claim 1, further comprising a base attached to the shaft, the base being connected to the central hub of the wheel.

11. The wheel assembly of claim 10, further comprising a cap interposed between the base and the wheel cover, the cap including an opening for receiving the shaft.

12. The wheel assembly of claim 1, wherein the wheel cover includes a counterbore coaxial with the central opening, and the assembly further comprising an outer cap received in the counterbore.

* * * * *